(12) United States Patent
Moriki et al.

(10) Patent No.: US 7,975,076 B2
(45) Date of Patent: Jul. 5, 2011

(54) DATA PROCESSING SYSTEM FOR KEEPING ISOLATION BETWEEN LOGICAL PARTITIONS

(75) Inventors: Toshiomi Moriki, Kunitachi (JP); Keitaro Uehara, Kokubunji (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/923,174

(22) Filed: Sep. 8, 2010

(65) Prior Publication Data

US 2011/0004706 A1     Jan. 6, 2011

Related U.S. Application Data

(63) Continuation of application No. 12/453,110, filed on Apr. 29, 2009, now Pat. No. 7,797,466, which is a continuation of application No. 11/447,074, filed on Jun. 6, 2006, now Pat. No. 7,539,788, which is a continuation of application No. 10/372,266, filed on Feb. 25, 2003, now Pat. No. 7,080,291.

(30) Foreign Application Priority Data

Jan. 14, 2003   (JP) ................................. 2003-005241

(51) Int. Cl.
*G06F 3/00* (2006.01)
*G06F 13/12* (2006.01)
*G06F 12/00* (2006.01)
*G06F 11/00* (2006.01)

(52) U.S. Cl. .................. 710/10; 710/3; 710/20; 710/36; 710/62; 711/100; 714/1; 714/9; 714/53

(58) Field of Classification Search ........................ None
See application file for complete search history.

(56) References Cited

U.S. PATENT DOCUMENTS

4,340,933 A    7/1982  Miu et al.
(Continued)

FOREIGN PATENT DOCUMENTS

JP          11-353244        4/1999
(Continued)

OTHER PUBLICATIONS

Japanese Office Action dated Nov. 13, 2007 regarding Japanese Patent Application No. 2003-005241, in Japanese.

*Primary Examiner* — Alan Chen
(74) *Attorney, Agent, or Firm* — Stites & Harbison PLLC; Juan Carlos A. Marquez, Esq.

(57) ABSTRACT

When a subject of access of a transaction from an IO device is not any resource allocated to a logical partition to which the device having issued the transaction belongs, a report as an error is sent to a CPU, while the transaction is finished on the IO bus. To prevent a transaction between IO devices from gaining access to any resource in another logical partition, one access permission bit is provided for each combination of all the IO devices, and the access is permitted only when the bit has a predetermined value. A reset signal is provided by IO slot so that only an IO slot allocated to a specific logical partition can be reset without affecting any other logical partition. A transaction issued from an IO device in one logical partition is prevented from gaining access to a resource in another logical partition, while proper error handling can be performed.

6 Claims, 13 Drawing Sheets

U.S. PATENT DOCUMENTS

| | | |
|---|---|---|
| 4,843,541 A | 6/1989 | Bean et al. |
| 5,590,278 A | 12/1996 | Barthel et al. |
| 5,659,756 A | 8/1997 | Hefferon et al. |
| 6,223,299 B1 | 4/2001 | Bossen et al. |
| 6,279,046 B1 * | 8/2001 | Armstrong et al. ............... 710/5 |
| 6,330,656 B1 | 12/2001 | Bealkowski et al. |
| 6,381,682 B2 | 4/2002 | Noel et al. |
| 6,836,855 B2 | 12/2004 | Arndt |
| 2002/0010811 A1 | 1/2002 | Arndt et al. |
| 2002/0124127 A1 | 9/2002 | Dawkins et al. |

FOREIGN PATENT DOCUMENTS

| | | |
|---|---|---|
| JP | 2000-315197 | 3/2000 |
| JP | 2002-304364 | 2/2002 |

* cited by examiner

FIG.6A

INTERLEAVE AND ADDRESS AREA INFORMATION

| ABSOLUTE ADDRESS RANGE | ADDRESS CLASSIFICATION | INTERLEAVE EXISTENCE/RANGE ALLOCATION | DESTINATION BUS/SLOT NUMBER |
|---|---|---|---|
| | | | |

FIG.6B

ASSIGNED LOGICAL PARTITION INFORMATION FOR EACH SHOT

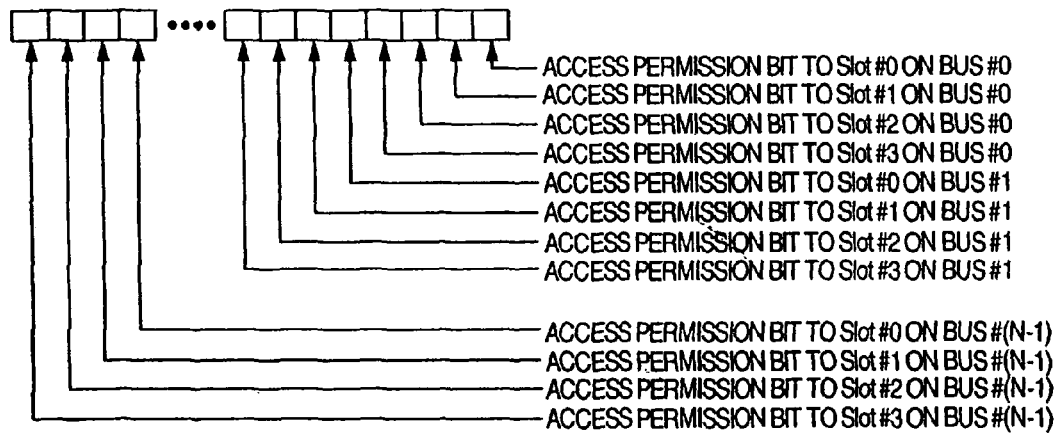

- ACCESS PERMISSION BIT TO Slot #0 ON BUS #0
- ACCESS PERMISSION BIT TO Slot #1 ON BUS #0
- ACCESS PERMISSION BIT TO Slot #2 ON BUS #0
- ACCESS PERMISSION BIT TO Slot #3 ON BUS #0
- ACCESS PERMISSION BIT TO Slot #0 ON BUS #1
- ACCESS PERMISSION BIT TO Slot #1 ON BUS #1
- ACCESS PERMISSION BIT TO Slot #2 ON BUS #1
- ACCESS PERMISSION BIT TO Slot #3 ON BUS #1

- ACCESS PERMISSION BIT TO Slot #0 ON BUS #(N-1)
- ACCESS PERMISSION BIT TO Slot #1 ON BUS #(N-1)
- ACCESS PERMISSION BIT TO Slot #2 ON BUS #(N-1)
- ACCESS PERMISSION BIT TO Slot #3 ON BUS #(N-1)

FIG.6C

ADDRESS ADDITIONAL VALUE FOR EACH LOGICAL PARTITION
IN ACCORDANCE WITH REAL ADDRESS RANGE

| BASE | SIZE | OFFSET |
|---|---|---|
| | | |

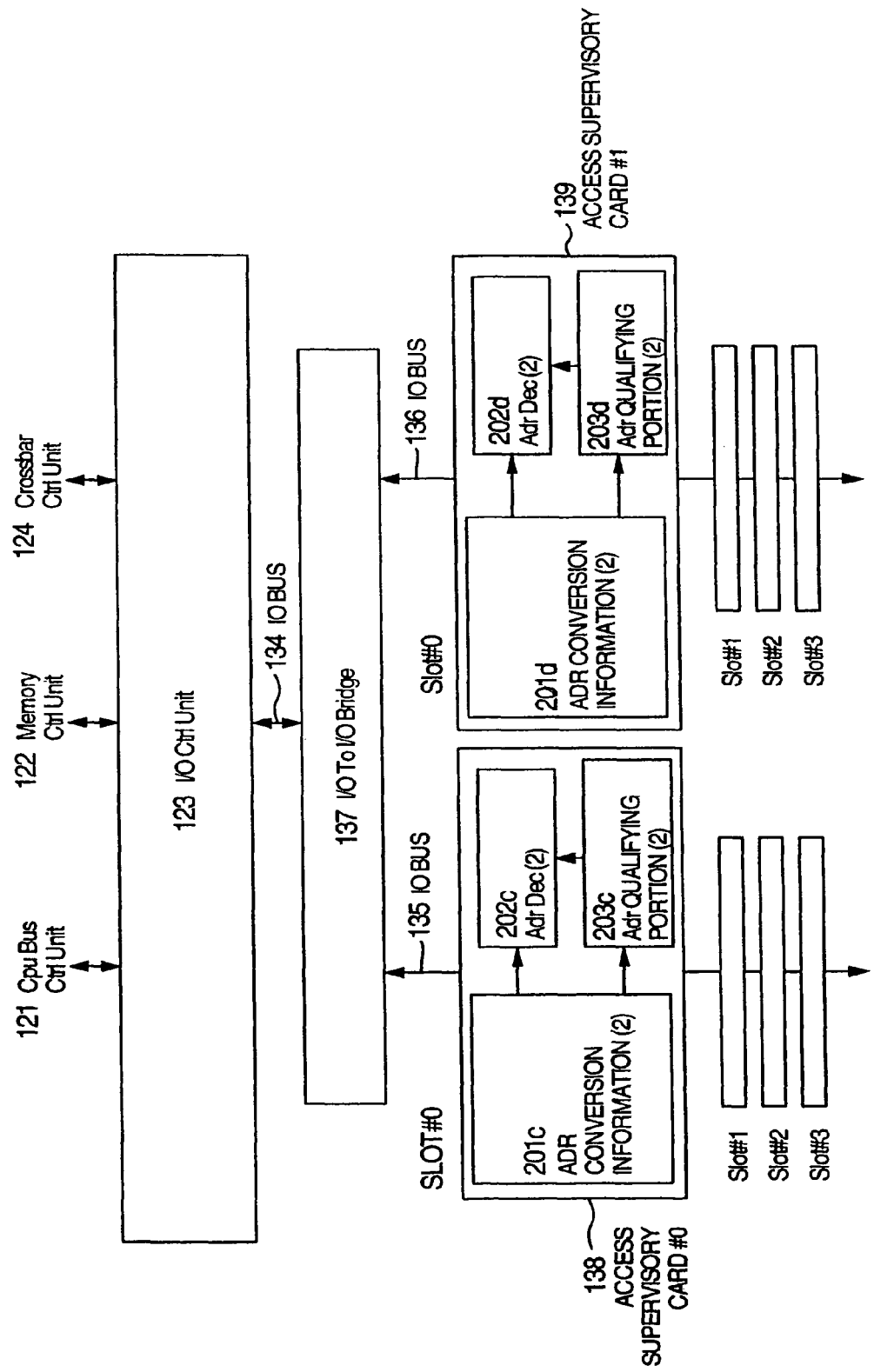

US 7,975,076 B2

DATA PROCESSING SYSTEM FOR KEEPING ISOLATION BETWEEN LOGICAL PARTITIONS

CROSS-REFERENCE TO RELATED APPLICATIONS

This application is a Continuation application of U.S. application Ser. No. 12/453,110 filed Apr. 29, 2009 now U.S. Pat. No. 7,797,466, which is a Continuation application of U.S. application Ser. No. 11/447,074 filed Jun. 6, 2006 now U.S. Pat. No. 7,539,788, which is a Continuation application of U.S. application Ser. No. 10/372,266 filed Feb. 25, 2003 now U.S. Pat. No. 7,080,291. Priority is claimed based on U.S. application Ser. No. 12/453,110 filed Apr. 29, 2009, which claims the priority date of U.S. application Ser. No. 11/447,074 filed Jun. 6, 2006, which claims the priority date of U.S. application Ser. No. 10/372,266 filed Feb. 25, 2003, which claims the priority date of Japanese Patent Application No. 2003-005241 filed Jan. 14, 2003, all of which is incorporated by reference.

BACKGROUND OF THE INVENTION

1. Field of the Invention

The present invention relates to a virtual computer system for allowing a plurality of Operating Systems (OSs) to operate on a single computer, and particularly relates to a method for preventing a malfunction caused by an illegal access between OSs and handling error occurrence, and a computer system using the method.

2. Description of the Related Art

Logical partitioning is a technique for allowing a plurality of operating systems (hereinafter referred to as "OS") to operate simultaneously on a single server. According to the logical partitioning, an administration program called a hypervisor allocates computer resources (including memory areas, IO devices, etc.) of a server to a plurality of logical partitions and allows an OS to operate in each logical partition in accordance with an instruction of a server administrator.

In the logical partitioning, the operation of an OS in one logical partition must not cause a halt or a malfunction in another OS in another logical partition. It is therefore necessary to secure isolation of each logical partition. The isolation means that an OS in one logical partition cannot gain access to any resource allocated to another logical partition.

PCI buses are used broadly as IO buses in PC servers typified by the IA-32 and IA64™ architectures proposed by Intel Corporation. Since the PCI buses are not designed in consideration of logical partitioning, there is a fear that access from an IO device makes it impossible to keep the isolation (hereinafter referred to as "isolation obstruction"). Specifically, the isolation cannot be secured at the time of a defect in an OS or failure in detecting an error by hardware due to a failure in an IO card. Therefore, in order to attain logical partitioning in a PC server, it has been a problem in the related art to secure isolation against access from IO devices.

Against the aforementioned problem, there is a known example disclosed in US2002/0010811A1 (hereinafter referred to as "known example 1") in the related art. In the known example 1, a PCI-to-PCI bridge called a terminal bridge stores an address range accessible in a transaction issued from an IO device. According to the known example 1, when a destination address of a transaction is out of an accessible area, the received transaction is aborted. Thus, isolation is attained.

SUMMARY OF THE INVENTION

However, the following problems have not been solved in the known example 1.

The first problem is that the received transaction from the IO device is terminated normally on an IO bus, and a hypervisor is notified of that. When the reception of the transaction is aborted simply, the source IO device may be time-out or data transfer with another IO device cannot be performed correctly. In addition, if the hypervisor is not notified, proper error handling such as rebooting a corresponding OS cannot be performed.

The second problem is that the known example 1 does not take transfer between IO devices into consideration. A server typically holds a large number of IO slots. Therefore, according to a system for storing the propriety of access in an address range, the number of combinations of the IO slots is so large that a wide storage area is required.

The third problem is that the known example 1 does not take it into consideration to allocate IO devices by slot to each logical partition or to initialize the allocation of the IO devices by slot. Therefore, there is a problem that when an IO slot is reset, IO cards allocated to the other logical partitions are also reset.

An object of the present invention is to solve the foregoing problems.

Other objects, features and advantages of the invention will become apparent from the following description of the embodiments of the invention taken in conjunction with the accompanying drawings.

BRIEF DESCRIPTION OF THE DRAWINGS

FIGS. 6A to 6C are format tables of ADR conversion information in the present invention;

FIG. 7 is a block diagram of a second configuration example of an I/O Ctrl Unit in the present invention;

DETAILED DESCRIPTION OF THE EMBODIMENTS

Embodiments of the present invention will be described below with reference to the drawings.

First Embodiment

Figure 1:
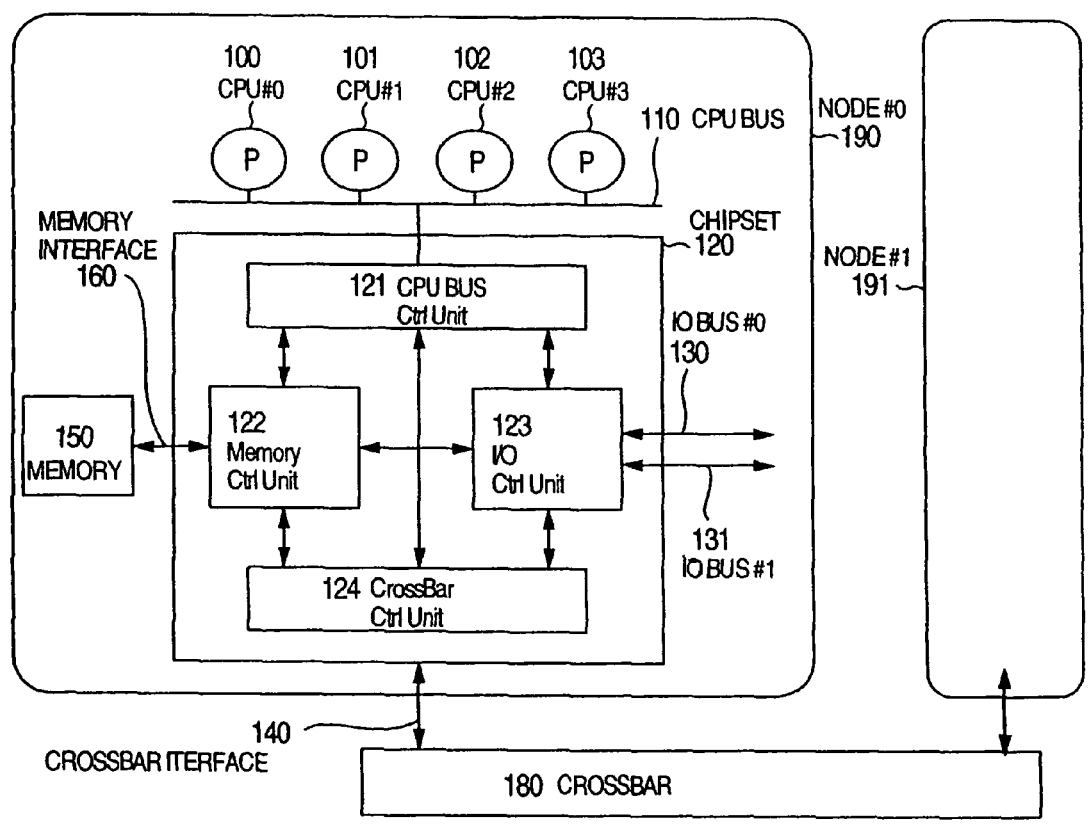
FIG. 1 is a block diagram showing an example of the configuration of a server expected in the present invention.

FIG. 1 shows the outline of a server expected by the present invention. In this embodiment, four CPUs (100-103) are connected to a CPU bus 110 to which a plurality of CPUs can be connected, by way of example. Although the number of CPUs is 4 in this embodiment, it is not limited to 4.

A chipset 120 for controlling the CPU bus is provided. The chipset 120 controls not only the CPU bus but also an IO bus #0 130, an IO bus #1 131, a memory interface 160, and a crossbar interface 140. PCI buses generally used at present are expected as the IO buses.

Incidentally, although this embodiment shows an example of the configuration in which the two IO buses 130 and 131 are connected, the number of IO buses is not limited to 2.

The chipset 120 is constituted by a CPU Bus Ctrl Unit 121 for controlling the CPU bus, a Memory Ctrl Unit 122 for controlling the memory interface, an IO Ctrl Unit 123 for controlling the IO buses, and a CrossBar Ctrl Unit 124 for controlling the crossbar interface.

In the present invention, the CPUs, the chipset, a memory 150 and IO devices (not shown) connected to the IO buses are handled as a node collectively, and a server capable of connecting with a plurality of nodes through a crossbar 180 is assumed. Incidentally, although the two-node configuration of a node #0 190 and a node #1 191 is shown in FIG. 1 by way of example, the number of nodes is not limited to 2.

A virtual computer system provided by this server is implemented by software called a hypervisor.

Figure 2:
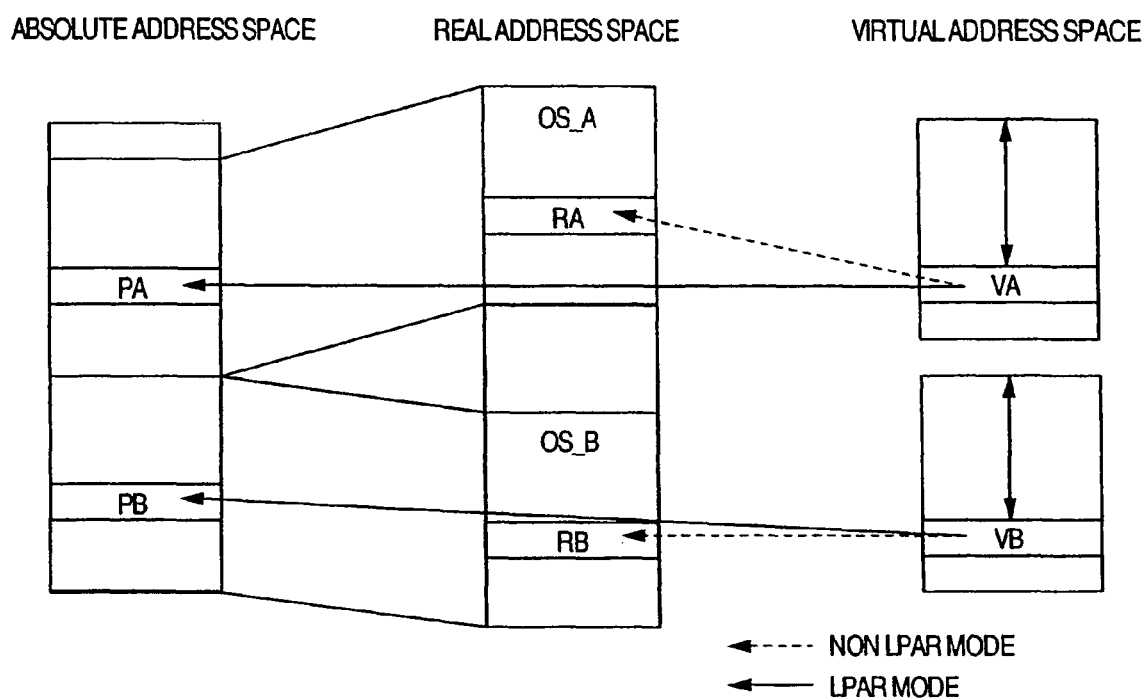
FIG. 2 is an address map view expected in the present invention.

FIG. 2 shows a correlation chart among address maps used in the virtual computer system.

The address map provided by the server in FIG. 1 is called an absolute address space. The real address space in FIG. 2 shows addresses used by OSs, and the virtual address space in FIG. 2 shows addresses used by application programs.

FIG. 2 shows an example in which two OSs are operating in logical partitions respectively, and the OSs are referred to as OS A and OS B respectively. Assume that virtual addresses VA and VB used by different application programs operating on the OS A and the OS B respectively are converted into addresses denoted by the signs RA and RB respectively when logical partitioning is not used (shown as non-LPAR mode translation.) If there is no address conversion by the hypervisor in a logical partitioning mode, the OS A and the OS B will gain access to one and the same absolute address when the addresses RA and RB have one and the same value. Thus, normal operation cannot be expected. To prevent this, the hypervisor makes the OSs gain access to addresses PA and PB (≠PA) corresponding to the addresses RA and RB respectively (shown as LPAR mode translation.)

In the virtual computer system, access from CPUs and IO devices will be described below.

In the case of access from a CPU, the hypervisor detects that the OS A tries to insert a TLB entry into the CPU for converting the address VA into the address RA, and the hypervisor insert the TLB entry for converting the address VA into the address RA instead of the OS. The hypervisor can calculate the address PA on the basis of the address RA and the information of memory allocation to each logical partition. If an application program gains access to the address VA actually, this access will be gained not to the address RA but to the address PA because the TLB entry for converting the address VA into the address PA has been inserted by the hypervisor. Thus, address conversion for each logical partition is attained as shown in FIG. 2.

Figure 3:
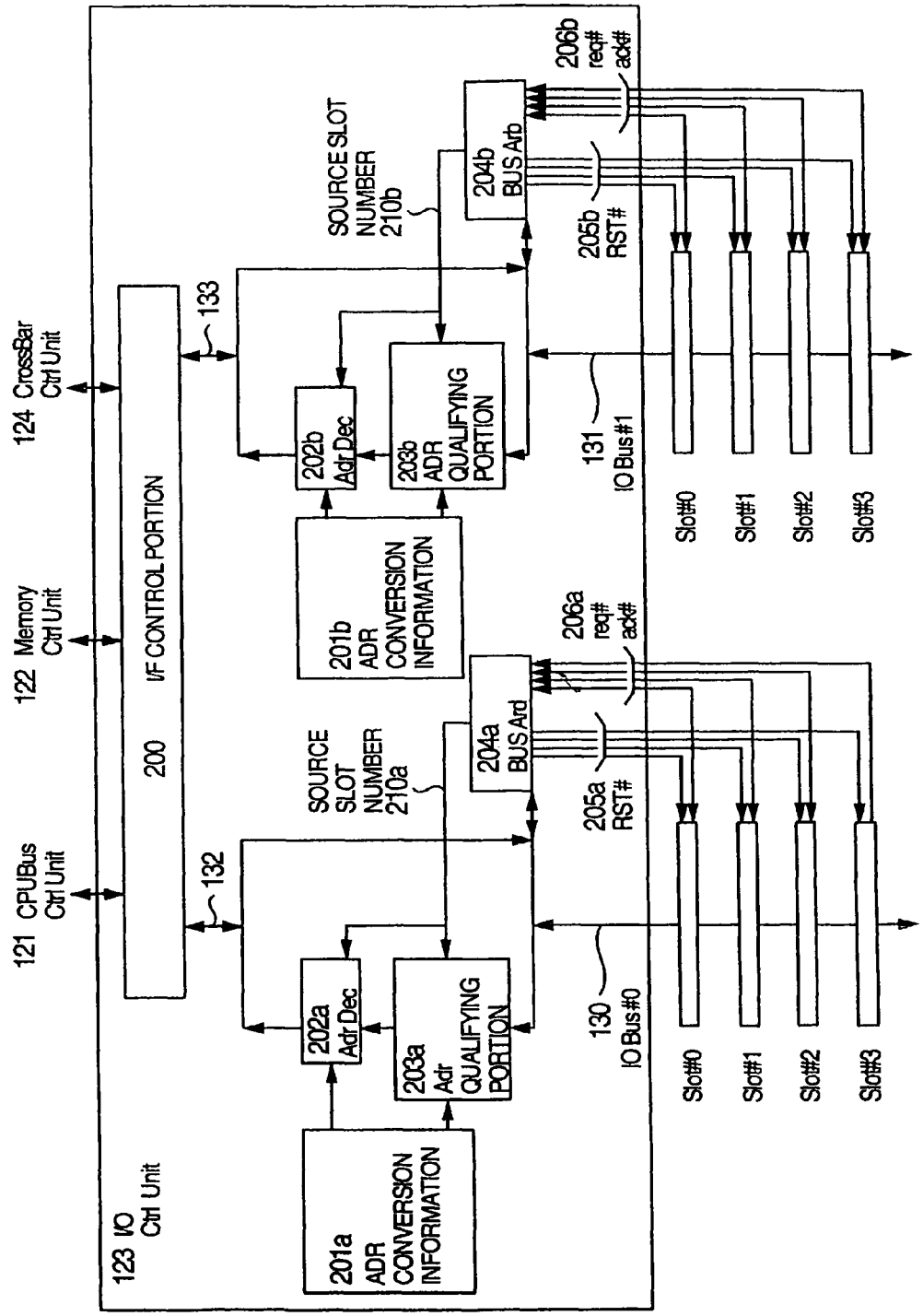
FIG. 3 is a block diagram of a first configuration example of an I/O Crtl Unit in the present invention.

On the other hand, in the case of access from an IO device, different from the case of access from a CPU, there is no address conversion function corresponding to TLB. Thus, address conversion cannot be performed by the hypervisor. Therefore, according to the present invention, the I/O Ctrl Unit 123 in FIG. 1 is configured as shown in FIG. 3. That is, the logical partition from which a request of access has been issued is recognized in accordance with the access from the IO, and address conversion is performed to make the logical partitions gain access to different addresses from one to another. The mechanism of this address conversion will be described below with reference to the drawings.

FIG. 3 shows an example of the configuration of the I/O Ctrl Unit 123. The I/O Ctrl Unit 123 controls the I/O buses 130 and 131. In the configuration shown in this embodiment, there are four slots #0 to #3 in each IO bus. The IO buses have signal lines 206*a* and 206*b* for arbitrating access requests from IO devices on these slots, respectively. Access requests through the signal lines 206*a* and 206*b* are arbitrated by Bus Arbs (Bus Arbitration circuits) 204*a* and 204*b* respectively so that an Ack response is given to each slot capable of issuing an access request.

Figure 12:
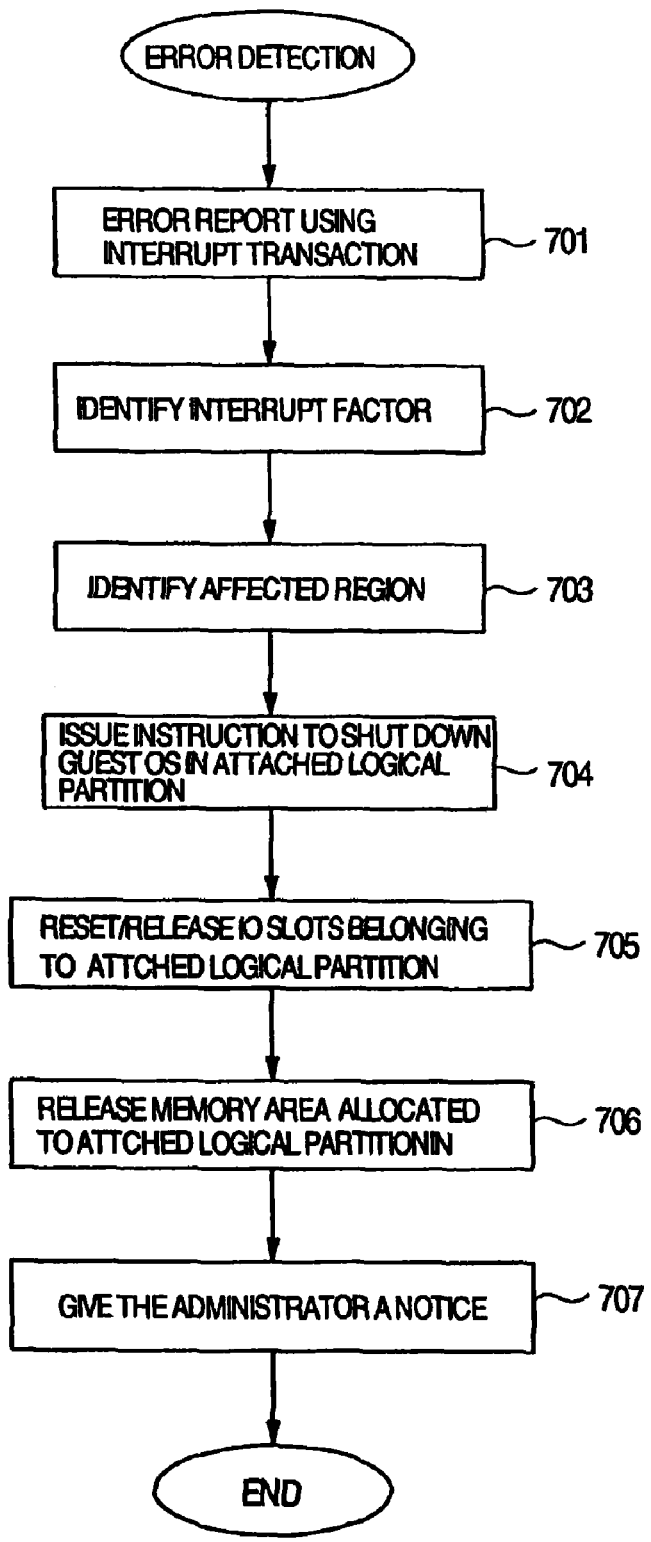
FIG. 12 is a processing flow chart for error handling in the present invention.

In addition, a typical IO bus has, only one reset signal for initializing IO devices on the bus, which signal is used in common to all the slots. In the present invention, however, a reset signal line 205*a*, 205*b* is prepared for each slot independently while assert/negate of reset signals is controlled by the Bus Arb 204*a*, 204*b*. Thus, initialization can be performed on each slot so that reboot and re-initialization can be performed on each logical partition. The procedure for re-initializing an IO slot using the reset signal 205*a*, 206*a* will be described later with reference to FIG. 12.

Assume that any one of the slots on the IO buses 130 and 131 issues a request of access to another IO bus, a CPU or a memory as a result of the arbitration of the bus arbitration circuit. In this case, the access request is transmitted to the I/O Ctrl Unit 123 through the IO bus. In the I/O Ctrl Unit, the destination address of the access request is qualified based on the value of the address by an address qualifying portion 203*a* or 203*b*. This qualification means the address conversion to gain access to unique address range assigned to each logical partition as described above.

Figure 4:
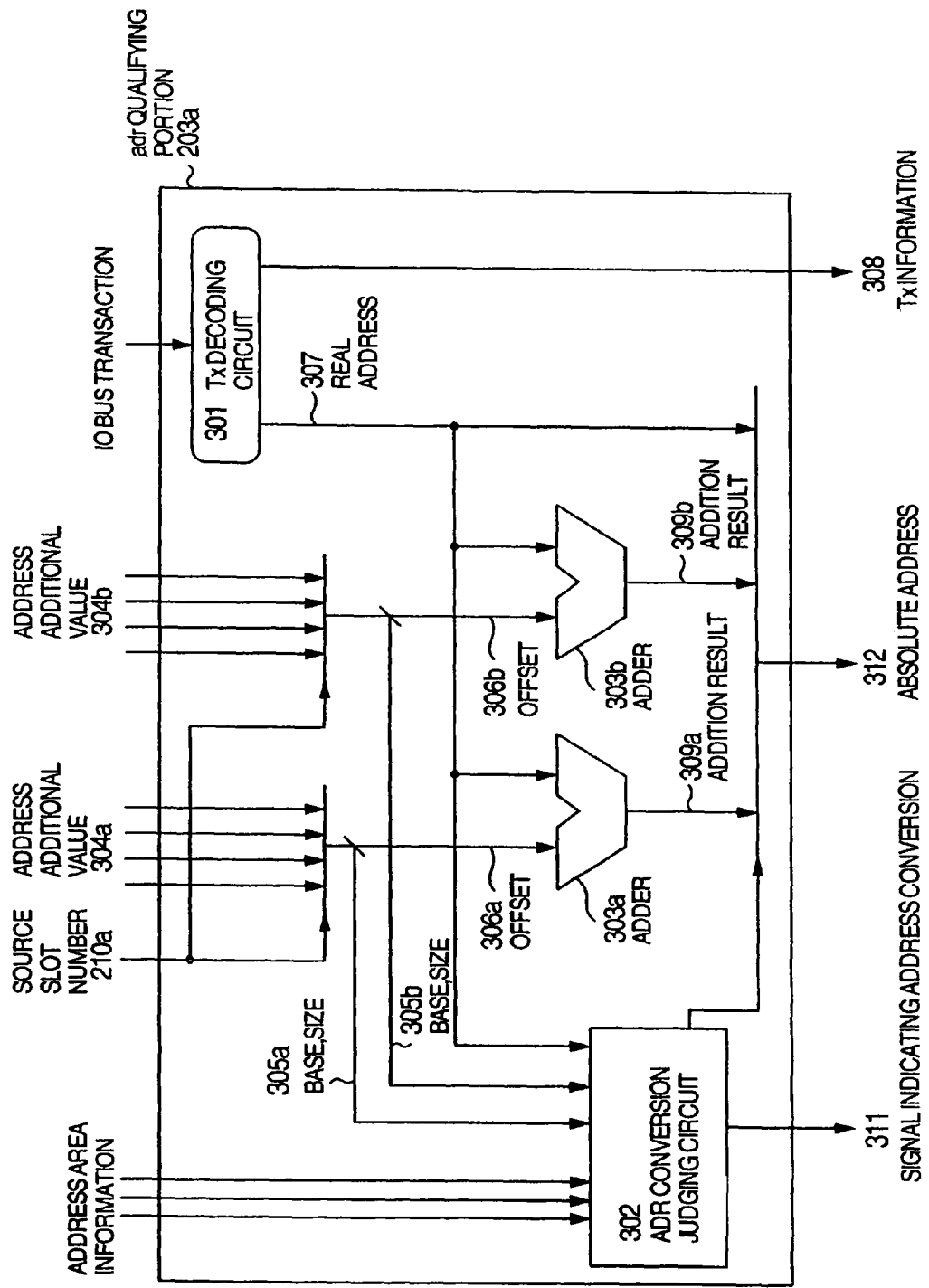
FIG. 4 is a configuration block diagram of an Adr qualifying portion in the present invention.

FIG. 4 shows an example of the configuration of the address qualifying portion 203*a*. Incidentally, the address qualifying portion 203*b* has quite the same circuit as the address qualifying portion 203*a*. Therefore, description will be made only on the address qualifying portion 203*a* in this embodiment. In the circuit example shown in FIG. 4, information about address conversion is used, which information is stored as ADR conversion information 201*a*. This information includes the following pieces of information. (1) Interleave and address area information, (2) assigned logical partition information prepared for each slot, and (3) an address additional value prepared for each logical partition in accordance with the real address range. FIGS. 6A to 6C show formats of registers for storing these pieces of information respectively.

FIG. 6A shows the format of the interleave and address area information, which includes various kinds of information corresponding to the range specified by an absolute address of the address map described in FIG. 2. The information includes address classification, interleave existence/range allocation, and destination bus/slot number. Distinction as to whether the address range has been allocated to a memory device or an IO device by a memory mapped IO (hereinafter referred to as "MMIO") is stored in the field of the address classification. When the address range has been allocated to a memory device, information as to whether the address range has been allocated to a memory device in a specific node or interleaved among memory devices in a plurality of nodes is stored in the field of the interleave existence/range allocation. When the address range has been allocated to an IO device (hereinafter referred to as MMIO area), the bus number and the slot number of an IO device as a subject of access are stored in the field of the destination bus/slot number. The interleave and address area information in FIG. 6A is set by BIOS (Basic IO System) or firmware during the initialization sequence of the server. Even servers that do not support logical partitioning especially are also provided with information similar to the interleave and address area information.

FIG. 6B shows the assigned logical partition information for each slot, which is information for identifying a PCI slot accessible by each source PCI slot (that is, belonging to one and the same logical partition). Access is permitted only to a slot having the permission bit in this information set to be 1. This information is set by the hypervisor when each logical partition is created. In addition, as a variation of this register format, access may be permitted only to a slot having the permission bit set to be 0.

This information uses a storage capacity of one bit for each combination of a source IO slot and a destination IO slot. Accordingly, effect similar to that in the system according to the known example 1 in which it is necessary to store an address range for each combination, can be attained by an extremely reduced storage capacity. The second problem described previously is solved thus.

FIG. 6C shows the address additional value for each logical partition in accordance with the real address range, which value is information for performing address conversion proper to each logical partition from a real address to an absolute address. This information is set by the hypervisor when each logical partition is created.

The procedure for setting each piece of information in FIGS. 6A to 6C will be described with reference to FIG. 11.

In Step 601, as soon as power is turned on, POST (Power On Self Test) is performed for checking on a failure in hardware.

Next, in Step 602, an initialization code of the BIOS and the firmware is carried out. Here, the condition of the mounted memory and the condition of the connected IO devices are examined, and the interleave and address area information in FIG. 6A is set.

Next, in Step 603, the hypervisor is loaded. A flexible disk or a hard disk is typical as a boot device in the same manner as in other OSs, but another device may be used. After that, the hypervisor initializes itself.

In Step 604, the hypervisor waits a new logical partition creation request from a server administrator. A console screen through a CRT or a serial line, a liquid crystal display (LCD) panel, electronic mail or the like can be considered as the interface for receiving an instruction from the server administrator, but it is not limited to these especially. Through such an interface with the hypervisor, the server administrator specifies the absolute memory address range allocated to a logical partition to be set up newly, the IO device (or slot) numbers allocated thereto, and the boot device of an OS operating therein. Other pieces of information may be provided as options. Examples of the options may include specifying a method for allocating CPUs to each logical partition or specifying a ratio of CPU time.

In Step 605, the hypervisor allocates a memory area specified by the server administrator to the logical partition created newly.

Next, in Step 606, the hypervisor allocates IO devices specified by the server administrator to the logical partition created newly.

In Step 607, the hypervisor sets the assigned logical partition information for each slot in FIG. 6B and the address additional value for each logical partition in accordance with the real address range in FIG. 6C on the basis of the condition of the allocated memory area and the allocated IO devices specified by the server administrator. These register settings make the functions of the Adr Decs 202a and 202b and the Adr qualifying portions 203a and 203b valid, as will be described later.

In Step 608, the hypervisor calls a boot loader of the OS stored in the boot device specified by the server administrator, and makes the OS start to operate on the new logical partition.

The Adr qualifying portion 203a shown in FIG. 4 receives inputs including address additional values 304a and 304b in FIG. 6C, address area information in FIG. 6A, a source slot number 210a supplied from the Bus Arb 204a, and an IO bus transaction. This embodiment shows an example in which two address additional values are provided for each source slot number 210a, but the number of address additional values is not limited to two.

The IO bus transaction is separated into Tx information and a real address 307 by a Tx decoding circuit 301. The Tx information indicates the classification of the transaction such as read or write. The real address 307 indicates the access destination. The Tx information is outputted as it is without suffering any processing.

One of the address additional values 304a and 304b is chosen in accordance with the source slot number 210a, and then separated into a BASE and SIZE part 305a, 305b and an OFFSET part 306a, 306b.

The real address 307 is supplied to an adder 303a, 303b so as to be added with the OFFSET part 306a, 306b.

An ADR conversion judging circuit 302 chooses one of the addition result 309a, 309b and the real address 307, and outputs the chosen address as an absolute address 312. The judging procedure in this circuit is as follows.

The real address 307 is compared with the absolute address range in the address area information so that it is judged whether the real address 307 is in the MMIO area or not. In this embodiment, it is premised that the MMIO area should not suffer address conversion. When the real address 307 is in the MMIO area, the real address 307 is outputted as the absolute address 312. At the same time, a signal 311 indicating address conversion is negated to give a notice that address conversion has not been performed.

When the real address 307 is not in the MMIO area, it is judged whether the real address 307 agrees with the real address range specified by the BASE and SIZE part 305a, 305b or not. When it agrees, a corresponding addition result 309a or 309b is chosen and outputted as the absolute address 312. At the same time, the signal 311 indicating address conversion is asserted to give a notice that the address conversion has been performed.

When the real address 307 does not agree with the real address range specified by the BASE and SIZE part 305a, 305b, the real address 307 is outputted as the absolute address 312. At the same time, the signal 311 indicating address conversion is negated to give a notice that the address conversion has not been performed.

Figure 5:
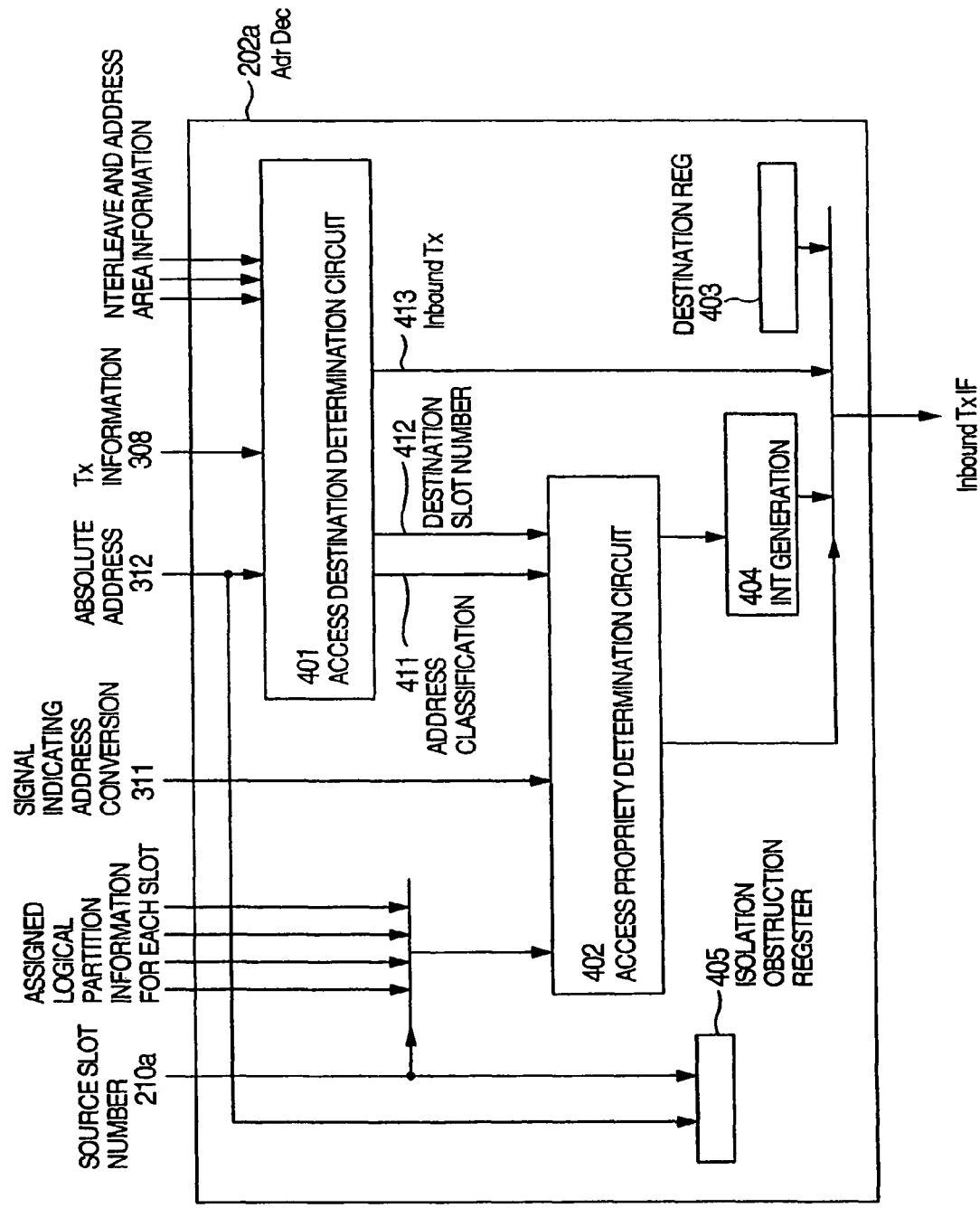
FIG. 5 is a configuration block diagram of an Adr Dec in the present invention.

FIG. 5 shows an example of the configuration of the Adr Dec 202a. In this embodiment, the circuit used as the Adr Dec 202a is identical to the circuit used as the Adr Dec 202b. Therefore, only the Adr Dec 202a is illustrated. The Adr Dec 202a receives the Tx information 308, the absolute address 312 and the signal 311 indicating address conversion outputted from the Adr qualifying portion 203a in FIG. 4. Further, the Adr Dec 202a receives the interleave and address area information and the assigned logical partition information for each slot from the ADR conversion information 201a, and the source slot number 210a from the Bus Arb 204a. The Adr Dec 202a issues an intra-chipset transaction (hereinafter referred to as "Inbound Tx") to an other Ctrl Unit IF control portion 200 in FIG. 2.

An access destination determination circuit 401 receives the absolute address 312, the Tx information 308 and the interleave and address area information, determines the access determination of the transaction, and outputs an Inbound Tx 413. At the same time, the access destination determination circuit 401 gives an access propriety determination circuit 402 the classification (memory, IO device, CPU, etc.) of the access destination through address classification 411 and the IO bus number and the IO slot number of the destination through a destination slot number 412.

The access propriety determination circuit 402 receives the signal 311 indicating address conversion, the address classification 411, the destination slot number 412 and the assigned logical partition information for each slot chosen in accordance with the source slot number 210, and selects Tx to be issued to the Inbound Tx IF. The procedure to determine the propriety of access is as follows.

(1) When the address classification 411 indicates an IO device (MMIO), the access is permitted if, of the bit map of the assigned logical partition information for each slot, the access permission bit corresponding to the destination slot number 412 is 1 (or 0).

(2) When the address classification 411 indicates a CPU (interrupt transaction from an IO device), the access is permitted. In this embodiment, it is assumed that the CPUs are time-shared by all the logical partitions, and any interrupt vector of each logical partition is administered by the hypervisor. Thus, there is no fear that such access causes an obstruction in the operation of another OS.

(3) When the address classification 411 indicates a memory, and the address conversion existence 311 is asserted, the access is permitted.

When the access is permitted in any one of the aforementioned conditions (1)-(3), the Inbound Tx 413 is outputted to the Inbound Tx IF.

When the access does not satisfy any one of the conditions (1)-(3), the access propriety determination circuit 402 denies the access, exchanges the access destination address of the Inbound Tx IF 413 for an address registered in a destination Reg 403, and issues the address to the Inbound Tx IF. In addition, the access propriety determination circuit 402 makes an INT generator 404 generate an interrupt transaction to a CPU, and issue the interrupt transaction as the Inbound Tx. At the same time, the source slot number and the absolute address 312 are stored in an isolation obstruction register 405. The isolation obstruction register 405 can be read from the CPUs.

The CPU receiving the interrupt transaction performs error handling. The procedure of the error handling will be described with reference to FIG. 12.

In Step 701, the CPU receiving the interrupt transaction starts an error handling routine of the hypervisor registered in the interrupt vector.

In Step 702, the hypervisor identifies the generated error as an isolation obstruction between logical partitions on the basis of the value of an error register in the chipset or the information of an error record reported from the firmware.

In Step 703, the hypervisor identifies the region affected by the isolation obstruction. In the configuration example of FIG. 3, it is guaranteed constitutionally that the influence is limited to the logical partition to which the source IO slot belongs. Therefore, the IO slot number causing the isolation obstruction is acquired from the source slot number recorded in the isolation obstruction register 405, and the logical partition to which the IO slot belongs is identified. In this patent, each IO slot is allocated to a logical partition exclusively when the logical partition is created, and each IO slot is not shared with another logical partition. Thus, the logical partition to which an IO slot belongs can be identified uniquely from its IO slot number.

In Step 704, the hypervisor issues an instruction to shut down the OS operating in the logical partition (hereinafter referred to as "guest OS"). Examples of methods for the hypervisor to shut down the guest OS may include (1) a method in which the hypervisor gives the guest OS a notice that a fatal error such as an address parity error has occurred, so as to make the guest OS perform reboot processing, and (2) a method in which the logical partition in question is removed from the CPU allocation queue in the hypervisor. In addition, the hypervisor or the guest OS acquires obstruction log information such as the memory image of the guest OS in accordance with necessity for debugging the OS.

In Step 705, the hypervisor resets all the IO slots belonging to the logical partition in question by use of the RST# signal 205a provided for each slot, and then releases the IO slots so that they do not belong to any logical partition. This processing allows the IO slots to be reallocated to other logical partitions. The third problem described previously is solved thus.

In Step 706, the hypervisor releases the memory area allocated to the logical partition in question, so that the memory area does not belong to any logical partition. This processing allow the memory area to be reallocated to other logical partitions.

In Step 707, the hypervisor gives the server administrator a notice that the logical partition in question has caused an isolation obstruction. Examples of obstruction notification means may include an LCD panel for displaying the condition of the server, a buzzer, an administrative console screen, electronic mail, etc. The obstruction notification means may be provided specially for the notice of isolation obstruction, or may be used also as notification means for another failure occurrence.

Figure 11:
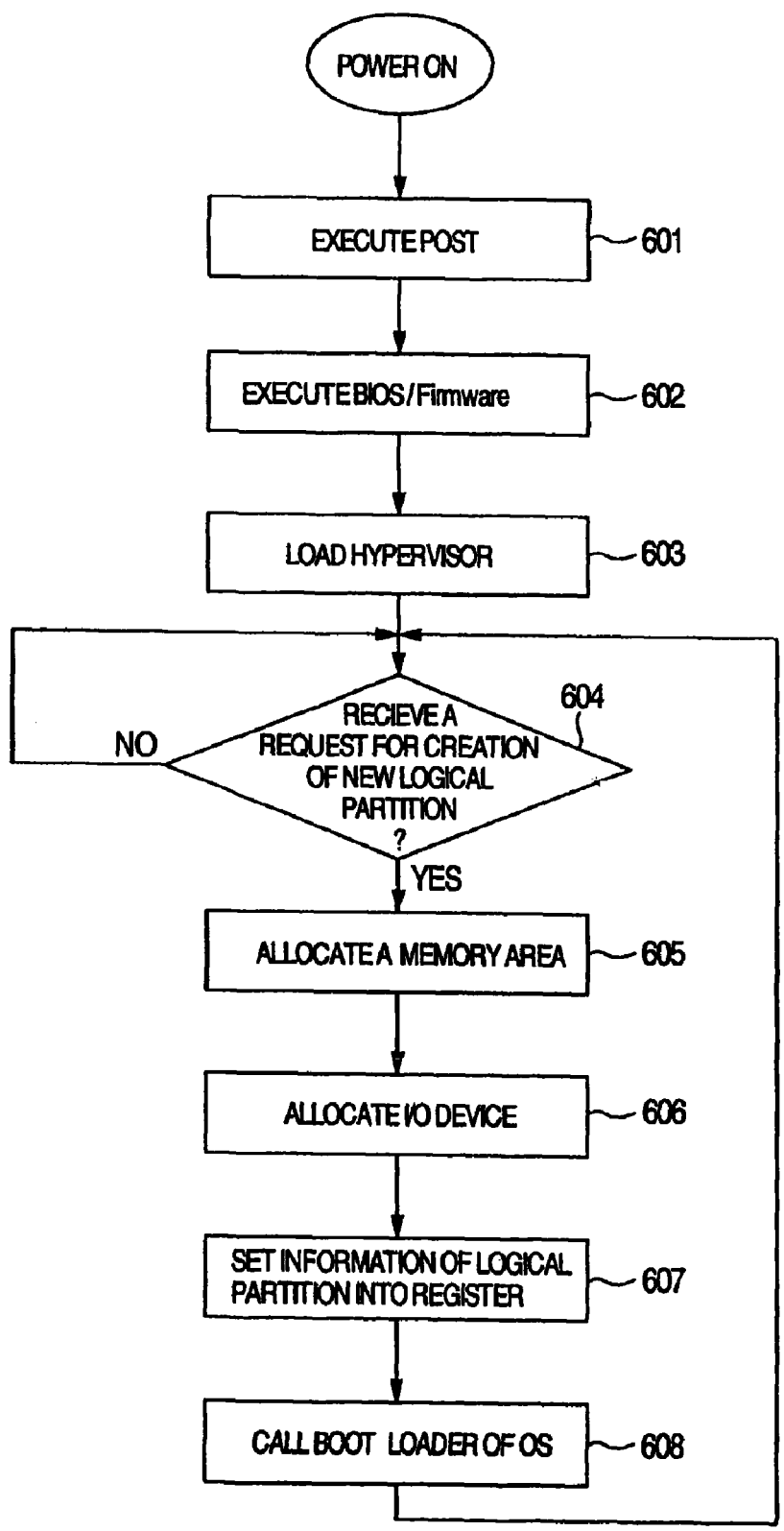
FIG. 11 is a processing flow chart for boot in the present invention.

A memory address that is used only by the hypervisor and that has not been allocated to any logical partition is set in the destination Reg 403 in FIG. 5 when the hypervisor initializes itself during the loading of the hypervisor in Step 603 in FIG. 11. Thus, data for another logical partition is prevented from being broken when isolation obstruction occurs, and the IO bus is allowed to finish the IO bus transaction in the same course as the processing of a regular access from an IO device. Thus, system down caused by time out of the IO device is prevented. The transaction having suffered the aforementioned processing is supplied to the other Ctrl Unit IF control portion 220 in FIG. 2. The other Ctrl Unit IF control portion 220 issues the Inbound Tx to the CPU Bus Ctrl Unit 121, the CrossBar Ctrl Unit 124, the Memory Ctrl Unit 122 or another IO bus through the signal line 132 or 133 on the basis of the Tx information and the absolute address. In response to a reply from each destination unit, the other Ctrl Unit IF control portion 220 issues a response transaction through the IO bus to the IO device on the IO bus having sent the access request. Thus, the access request is finished on the IO bus.

As a result, when isolation obstruction occurs due to an access from an IO device, the occurrence of isolation obstruction can be reported and error handling can be performed while keeping the operations of the IO devices belonging to the other logical partitions. The first problem described previously is solved thus.

Second Embodiment

This embodiment is a modification of the first embodiment, showing an example in which an I/O to I/O Bridge 137 has been added to the I/O Ctrl Unit 123 in FIG. 1.

This second embodiment shows an example of the configuration where one IO bus 134 is connected to an IO Ctrl Unit 123 due to the limitation of space in the paper. The I/O to I/O Bridge 137 is an LSI having a function to distribute one IO bus to a plurality of IO buses. Incidentally, in this embodiment, the reference numerals 134, 135 and 136 represent IO buses, which may be different kinds of IO buses or may be of the same kind of IO bus.

In the second embodiment, the ADR conversion information 201a and 201b, the Adr Decs 202a and 202b and the Adr qualifying portions 203a and 203b in the first embodiment are mounted as ADR conversion information (2) 201c and 201d, Adr Decs(2) 202c and 202d and Adr qualifying portions (2) 203c and 203d on an access supervisory card #0 138 and an access supervisory card #1 139 respectively, as shown in FIG. 7. Since the circuit used as the access supervisory card #0 138 is identical to the circuit used as the access supervisory card #1 139, description will be made only on the access supervisory card #0 138.

In the second embodiment, different from the first embodiment, IO devices are allocated to each logical partition not by slot but by IO bus. Therefore, the ADR conversion information (2) 201c holds only a part of the information 201a. Specifically, of the interleave and address area information in FIG. 6A, information other than the destination slot number is held. As for the assigned logical partition information in FIG. 6B, permission bits are held by only one bit per IO bus. On the other hand, the address additional value for each logical partition in accordance with the real address range in FIG. 6C is held as information not by IO slot but by IO bus.

The Adr qualifying portion (2) 203c monitors an IO bus transaction issued from another IO slot on the same bus, and performs the aforementioned address qualification using the IO bus transaction as an input. As described previously, in the second embodiment, IO devices are allocated by IO bus. Accordingly, differently from the Adr qualifying portion 203a in the first embodiment, the Adr qualifying portion (2) 203c receives the address additional value 304a, 304b one by one, and does not receive the source slot number 210a. The Adr Dec (2) 202c checks the destination address of the received IO bus transaction. Differently from the Adr Dec 202a in the first embodiment, the Adr Dec (2) 202c is not provided with the source slot number 210a, the path for issuing the Inbound Tx 413 to the Inbound Tx IF, and the destination Reg 403. When the access is permitted in the access propriety determination circuit 402, no transaction is issued to the Inbound Tx IF (IO bus in this case). When the access is not permitted, an interrupt transaction to the CPU is made up and the occurrence of isolation obstruction is reported.

As a result, when the IO bus 135 and the IO bus 136 belong to different logical partitions, it can be detected as isolation obstruction that a transaction issued from an IO device on the IO bus 135 has access to an IO device on the IO bus 136 through the I/O to I/O Bridge 137, and vice versa. That is, access from the IO bus 136 to the IO bus 135 can be also detected in the same manner.

Thus, the occurrence of isolation obstruction can be reported though the occurrence of isolation obstruction cannot be prevented perfectly. It is therefore possible to perform error-handling processing shown in FIG. 12. At that time, in Step 703 for identifying the affected region, not only the source logical partition having issuing the incriminated transaction but also the destination logical partition are identified to reboot the corresponding guest OS. The destination logical partition can be identified based on the absolute address 312 stored in the isolation obstruction register 405.

Third Embodiment

Figure 8:
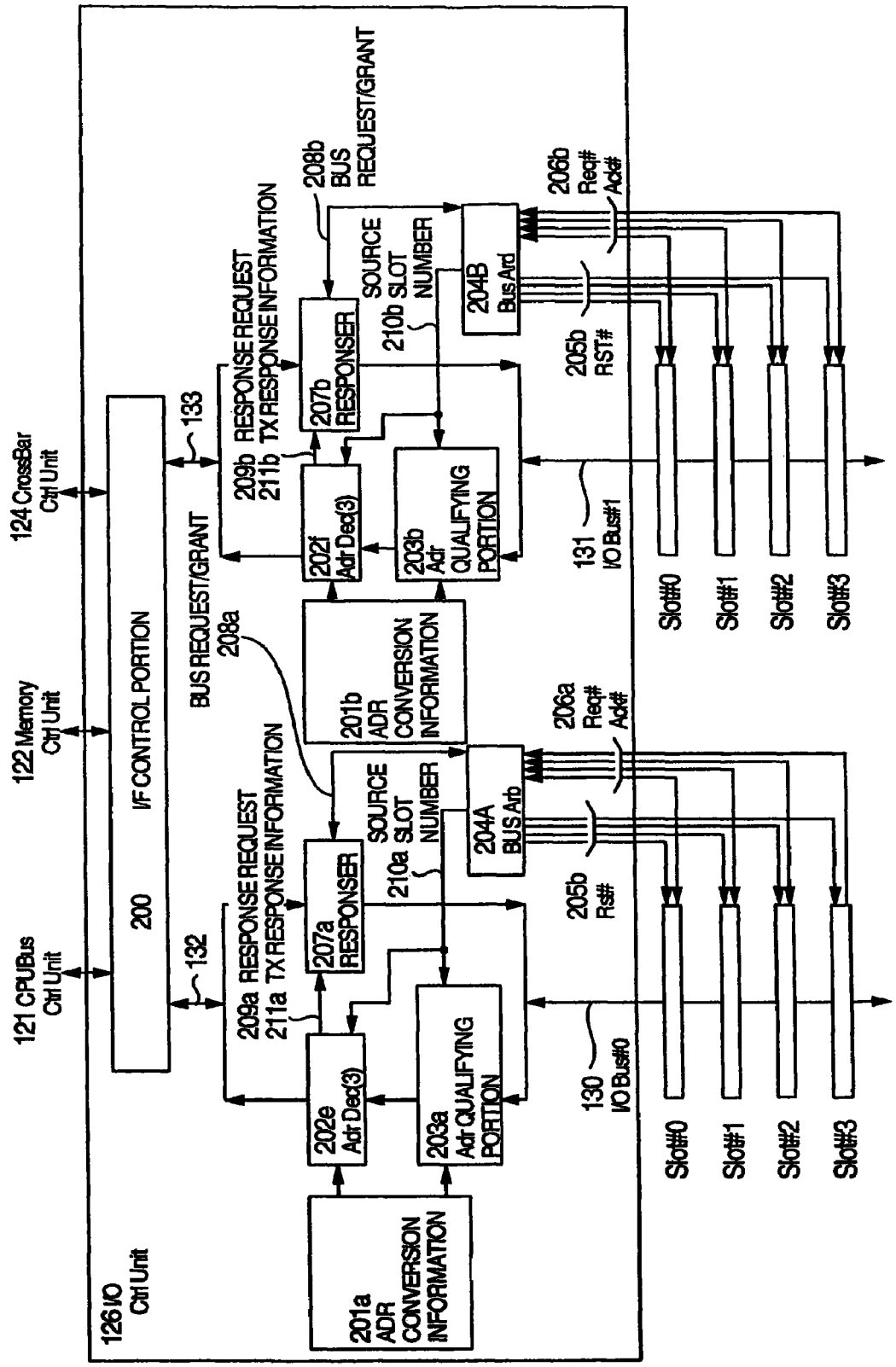
FIG. 8 is a block diagram of a third configuration example of an I/O Ctrl Unit in the present invention.

This embodiment is a modification of the first embodiment, in which the I/O Ctrl Unit 123 in FIG. 3 is arranged as an I/O Ctrl Unit 126 in FIG. 8.

Figure 9:
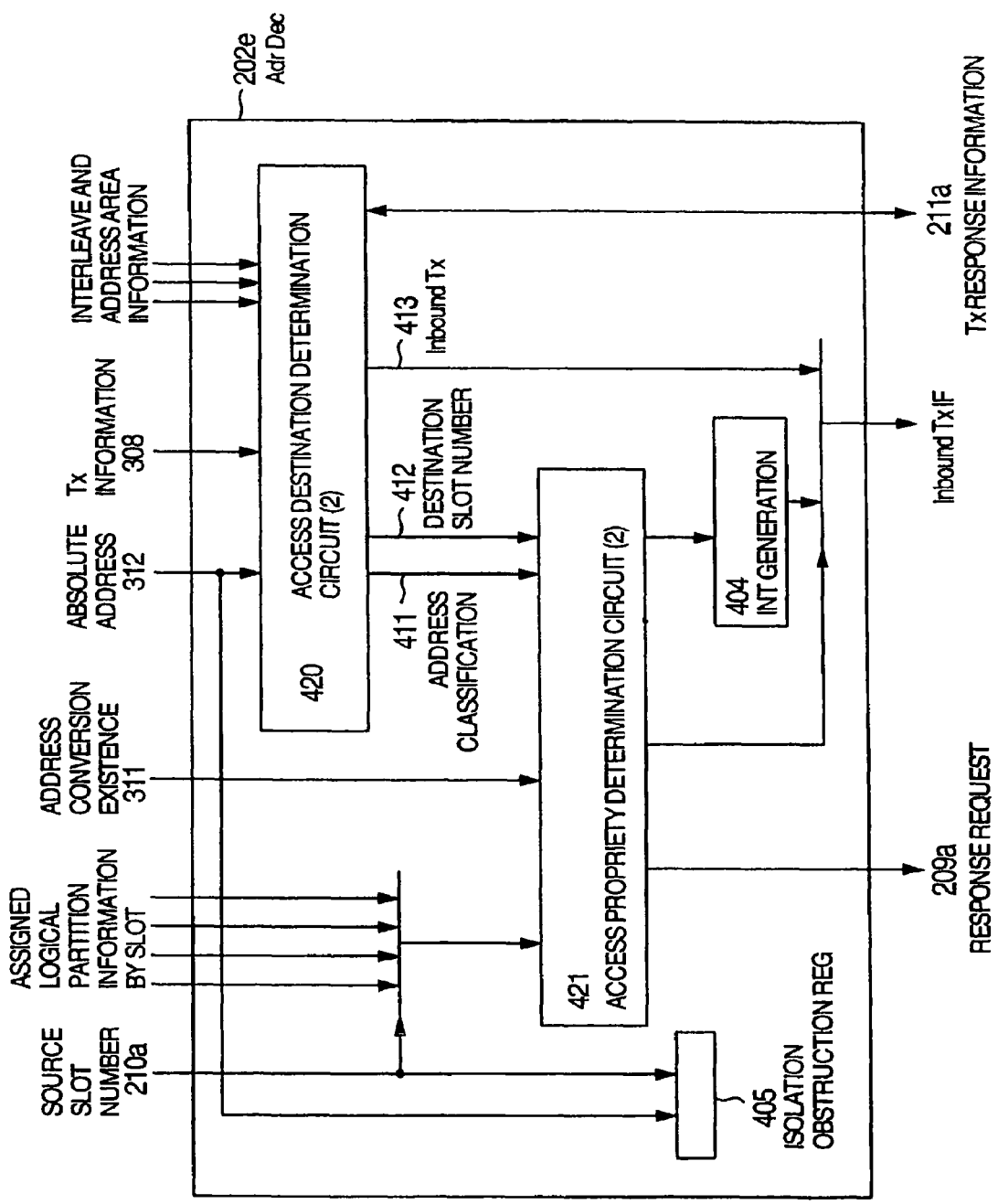
FIG. 9 is a block diagram of a second configuration example of an Adr Dec in the present invention.

The Adr Dec 202a in the first embodiment is arranged as an Adr Dec (3) 202e shown in FIG. 9. Since an Adr Dec (3) 202f has quite the same circuit as the Adr Dec (3) 202e, only the Adr Dec (3) 202e will be described below. An access propriety determination circuit (2) 421 determines the propriety of issuing a transaction in the same manner as the access propriety determination circuit 402 in the first embodiment, and issues an interrupt transaction. However, the access propriety determination circuit (2) 421 does not issue the Inbound Tx to the Inbound Tx IF when the access is determined not to be permitted, but uses a response request 209a to request a responder 207a to issue a response transaction with respect to the Inbound Tx. In addition, an access destination determination circuit (2) 420 uses Tx response information 211a to transmit information required for issuing the response transaction, such as classification of the transaction.

Figure 10:
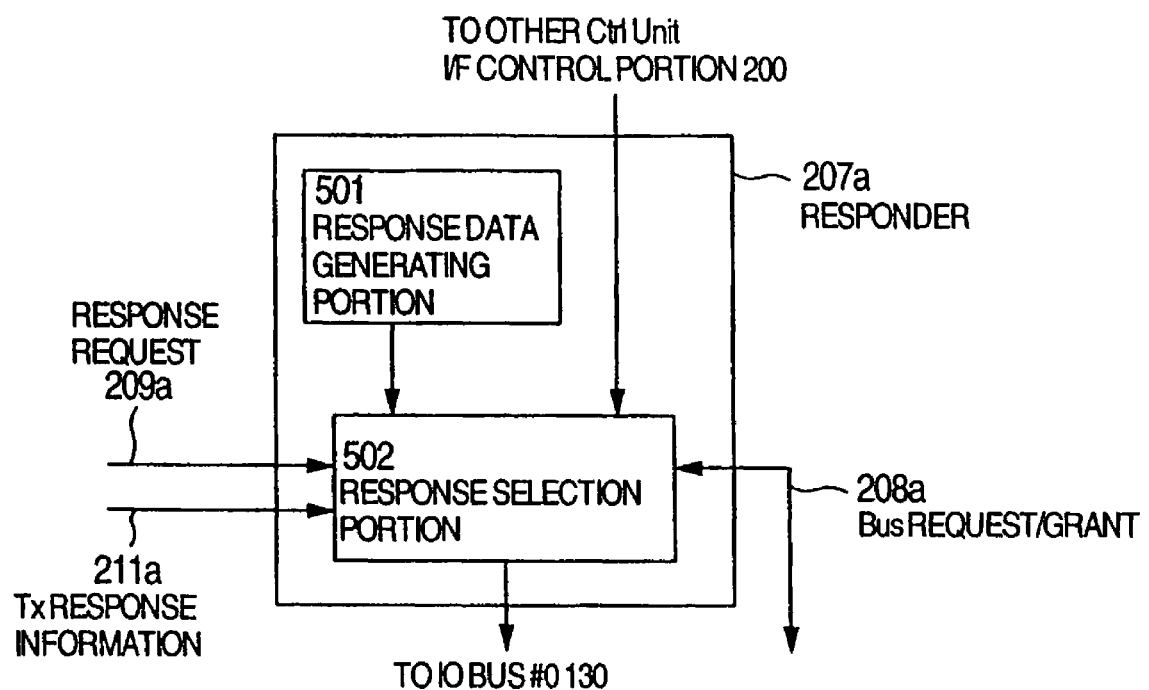
FIG. 10 is a block diagram of a configuration example of a responder in the present invention.

The responder 207a controls an IO bus transaction issued from the I/O Ctrl Unit 126 to the IO bus #0 130. Since a responder 207b also has quite the same circuit as the responder 207a, only the responder 207a will be described below with reference to FIG. 10.

A response selection portion 502 issues a bus request to the Bus Arb 204a by use of a bus request/grant signal 208a. Only when acquiring the bus grant, the response selection portion 502 issues an IO bus transaction to the IO bus #0 130. When there is no response request through the signal 209a, the response selection portion 502 outputs a transaction supplied from an other Ctrl Unit I/F control portion 200 to the IO bus #0 130. When there is a response request through the signal 209a, the response selection portion 502 transmits a positive acknowledgement transaction to the IO bus using the information of the transaction received from the Tx response information 211a and the data in a response data generating portion 501. Specifically, when the transaction in question is memory read or the like needing response data, the data generated in the response data generating portion 501 is transmitted as the response data. On the contrary, when the transaction is memory write or the like needing no response data, only Ack response is transmitted. As a result, the IO bus transaction causing isolation obstruction can be finished on the IO bus. Thus, system down is prevented from being caused by time out of the IO device.

Further, as a variation of the third embodiment, another configuration can be considered in which a negative acknowledgement transaction such as retry is always transmitted in response to an IO bus transaction causing isolation obstruction. This configuration cannot be used when the IO device detects time out on its own in order to prevent system down caused by continuous retry for a long time. However, there is a merit that the response data generating portion 501 can be omitted because negative response transactions generally need no response data.

Fourth Embodiment

Figure 13:
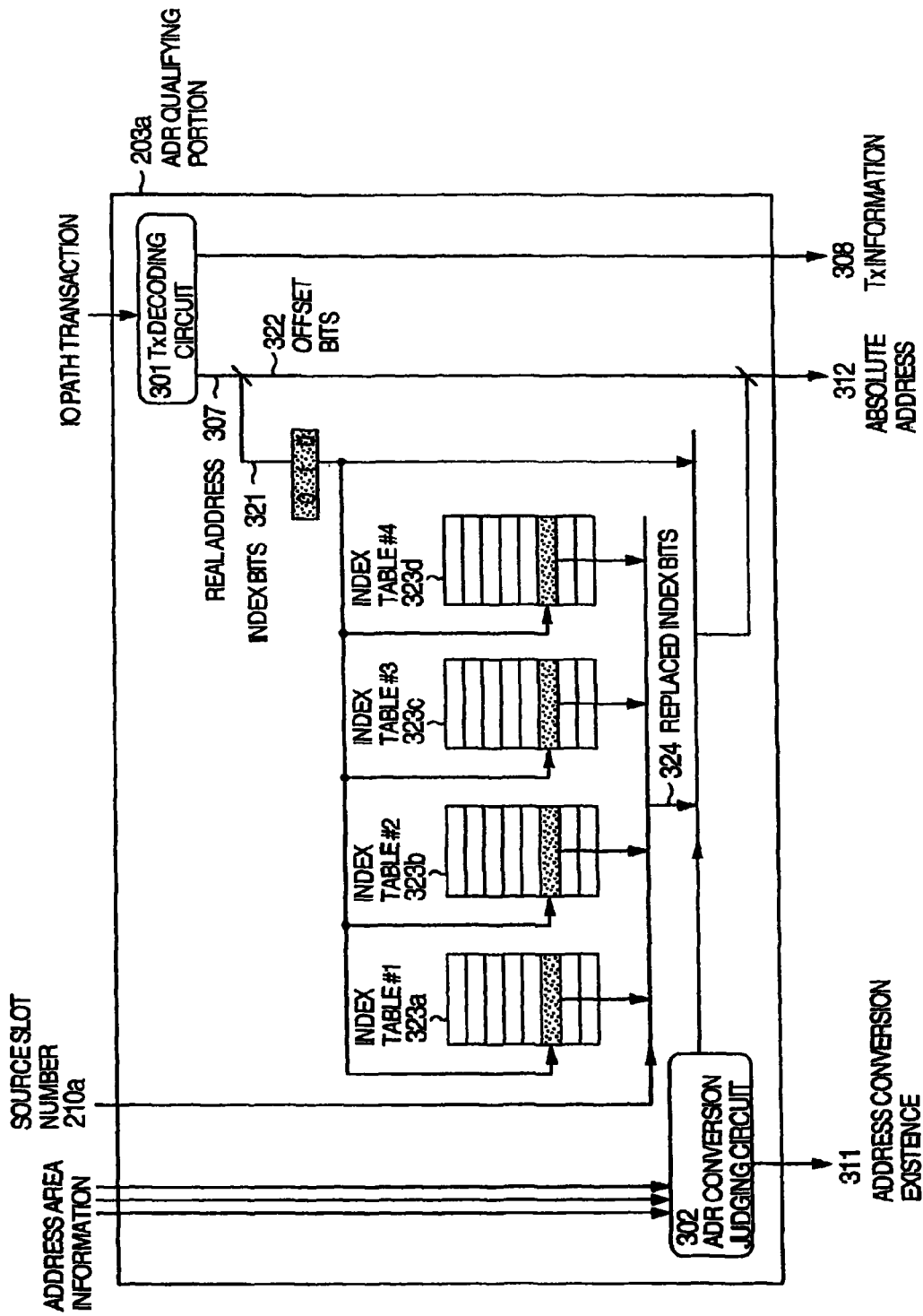
FIG. 13 is a block diagram of a second configuration example of an Adr qualifying portion in the present invention.

This embodiment is a modification of the first embodiment, in which the Adr qualifying portion 203a in FIG. 4 is arranged as an Adr qualifying portion 203g in FIG. 13. Differently from the Adr qualifying portion 203a in the first embodiment, the Adr qualifying portion 203g in the fourth embodiment does not receive the address additional value 304a but holds index tables 323a-323d. A real address 307 is separated into index bits 321 and offset bits 322. FIG. 13 shows an example in which the upper three bits are extracted as the index bits 321, whose value is "010". However, how long the index bits are and which bits are used as the index bits 321 are not limited to those in FIG. 13. The Adr qualifying portion 203g reads, of the index tables 323a-323d, values of entries specified by the value of the index bits 321, and selects one of them in accordance with the source slot number 210a so as to obtain replaced index bits 324. The replaced index bits 324 are chosen in the aforementioned address conversion judging circuit 302 if it is necessary to perform address conversion, while the index bits 321 are chosen if it is not necessary to perform address conversion. Then, the chosen bits are combined with the offset bits 322, and outputted as the absolute address 312.

In the fourth embodiment, it is indeed unnecessary to record an additional value for each logical partition in accordance with the real address range in FIG. 6C, but it is necessary to secure a storage capacity for storing the index tables 323a-323d. In comparison with the first embodiment, information required for address conversion can be reduced if memory fragmentation is heavy due to repeated creation and deletion of logical partitions. The information in the index tables 323a-323d has to be set in Step 607 for register update in FIG. 11. Setting the information allows the Adr qualifying portion 203g to operate.

When the present invention is applied to a part of a chipset in a server using a general-purpose IO bus typified by a PCI bus, the following advantages can be obtained.

Isolation obstruction caused by access from an IO device is prevented in a logical partitioning mode. Once isolation obstruction has occurred, proper error handling is performed on a logical partition where the obstruction has occurred, while IO devices belonging to other logical partitions are kept in operation.

Means for detecting isolation obstruction effectively for access among IO devices is provided in a logical partitioning mode.

As soon as isolation obstruction occurs, means for resetting only IO devices belonging to an affected logical partition by slot is provided to allow the IO devices to be reallocated to other logical partitions.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A data processing system comprising:
a plurality of central processing units;
a memory unit coupled to said plurality of central processing units;
a plurality of I/O devices;
a hypervisor that operates on said plurality of central processing units to control each of a plurality of logical partitions to which at least one of said plurality of central processing units and at least one of said plurality of I/O devices are allocated respectively such that a respective operating system can be executed individually on each of said logical partitions; and
an I/O control unit that is coupled to said plurality of central processing units and said memory unit, and to which said plurality of I/O devices are coupled, and
wherein said I/O control unit is connected with said plurality of I/O devices via a plurality of I/O slots, and said I/O control unit resets each of the I/O devices individually by asserting a reset signal prepared corresponding to the I/O slot that connects the I/O device with the I/O control unit.

2. The data processing system according to claim 1, wherein said I/O control unit includes a plurality of arbitrating units each connected with at least one of said plurality of I/O devices via said plurality of I/O slots, said arbitrating unit arbitrates each of access requests from said plurality of I/O devices and asserts/negates each of said reset signals for said plurality of I/O devices via said I/O slot that corresponds to each of said plurality of I/O devices.

3. The data processing system according to claim 2, wherein said arbitrating unit asserts said reset signal for said I/O device when said access request from the I/O device was in error.

4. The data processing system according to claim 1, wherein said I/O control unit includes;
a receiving unit which receives an access request from an I/O device among said plurality of I/O devices,
a specifying unit which specify a logical partition to which a destination of said access request belongs, and
a judging unit which judges whether the specified logical partition is matched with a logical partition to which the I/O device having issued said access request belongs; and
said I/O control unit resets I/O device allocated to said specified logical partition if said specified logical partition is different from said logical partition to which the I/O device having issued said access request.

5. The data processing system according to claim 4, wherein said hypervisor stops execution of an operating system on said logical partition to which said I/O device having issued said access request if said specified logical partition is different from said logical partition to which the I/O device having issued said access request.

6. The data processing system according to claim 4, wherein said hypervisor releases said I/O slot connected with the I/O device if said specified logical partition is different from said logical partition to which the I/O device having issued said access request.

* * * * *